United States Patent
Hiramatsu et al.

(10) Patent No.: US 8,083,262 B2
(45) Date of Patent: Dec. 27, 2011

(54) SEAT BELT RETRACTOR AND SEAT BELT APPARATUS

(75) Inventors: Koji Hiramatsu, Tokyo (JP); Hikaru Kameyoshi, Tokyo (JP); Tadayuki Asako, Tokyo (JP); Yasunori Fukuoka, Tokyo (JP)

(73) Assignee: Takata Corporation, Tokyo (JP)

( * ) Notice: Subject to any disclaimer, the term of this patent is extended or adjusted under 35 U.S.C. 154(b) by 295 days.

(21) Appl. No.: 12/588,780

(22) Filed: Oct. 28, 2009

(65) Prior Publication Data

US 2010/0117437 A1    May 13, 2010

(30) Foreign Application Priority Data

Nov. 7, 2008 (JP) ................... 2008-286431

(51) Int. Cl.
*B60R 22/34* (2006.01)
(52) U.S. Cl. .............................. 280/807; 242/379.1
(58) Field of Classification Search .............. 297/471, 297/472, 478; 280/806, 807; 242/379.1, 242/381.1, 382, 383.2, 383.5
See application file for complete search history.

(56) References Cited

U.S. PATENT DOCUMENTS

| | | | | |
|---|---|---|---|---|
| 4,323,205 A | * | 4/1982 | Tsuge et al. | 242/379.1 |
| 5,779,176 A | * | 7/1998 | Hori et al. | 242/379.1 |
| 6,216,972 B1 | * | 4/2001 | Rohrle | 242/379.1 |
| 7,152,824 B2 | * | 12/2006 | Shiotani et al. | 242/379.1 |
| 7,374,122 B2 | * | 5/2008 | Bell et al. | 242/379.1 |
| 7,392,957 B2 | * | 7/2008 | Hiramatsu | 242/379.1 |
| 2002/0050542 A1 | * | 5/2002 | Nagata et al. | 242/379.1 |
| 2004/0206844 A1 | * | 10/2004 | Shiotani et al. | 242/379.1 |

FOREIGN PATENT DOCUMENTS

| | | |
|---|---|---|
| JP | 2005-047449 | 2/2005 |
| JP | 2005-170266 | 6/2005 |
| JP | 2006-341711 | 12/2006 |

* cited by examiner

*Primary Examiner* — Paul N Dickson
*Assistant Examiner* — Robert A Coker
(74) *Attorney, Agent, or Firm* — Manabu Kanesaka

(57) ABSTRACT

A seat belt retractor includes a cylindrical member, a torsionally deformable shaft arranged inside the cylindrical member and having one end side connected to the cylindrical member, a plate mounting member arranged in the cylindrical member and disposed on an outer periphery of the shaft, a locking mechanism for preventing a rotation of the plate mounting member, and a plate member having one end portion fixed to the plate mounting member and the other end portion engaging an inner periphery of the cylindrical member. The plate member is plastically deformable so that the plate member is wound onto the plate mounting member. The plate mounting member includes a first reducing radius portion having a radius gradually decreasing toward a downstream in a winding direction, and a second reducing radius portion located on the downstream side and having a radius reducing rate greater than that of the first reducing radius portion.

8 Claims, 7 Drawing Sheets

SEAT BELT RETRACTOR AND SEAT BELT APPARATUS

BACKGROUND OF THE INVENTION AND RELATED ART STATEMENT

The present invention relates to a seat belt retractor for retracting a seat belt. More particularly, the present invention relates to a seat belt retractor having an Energy Absorption (hereinafter, referred to as "EA") mechanism for absorbing inertia energy applied to an occupant when withdrawal of a seat belt is prevented to restrain the occupant's movement in case of an emergency, and relates to a seat belt apparatus.

A seat belt apparatus installed in a vehicle seat is an essential apparatus for restraining an occupant from abruptly moving due to deceleration produced during a vehicle collision so as to ensure the safety of the occupant. The seat belt apparatus generally comprises a seat belt (webbing), a retractor, and a buckle.

The retractor retracts the seat belt into the inside thereof by means of spring force to wind up the seat belt onto a cylindrical member (spool). In addition, the retractor prevents the seat belt from being withdrawn from the cylindrical member when the collision occurs and the inertia energy is generated, thereby restraining the occupant's body from abruptly moving forward. However, as the forward movement of the occupant is abruptly restrained, the inertia energy due to reaction of restraint is applied to the occupant's chest and the like through the seat belt. To absorb the inertia energy applied to the occupant, the EA technique is employed to allow a predetermined length of the seat belt to be withdrawn while keeping a predetermined withdrawing load of the seat belt with applying withdrawing resistance of a certain value or more onto the seat belt immediately after locking the withdrawal, thereby absorbing impact energy applied to the occupant.

As the EA mechanism, there is known a mechanism comprising a torsionally deformable torsion bar which is arranged inside the cylindrical member such that the torsion bar can rotate relative to the cylindrical member, a locking mechanism which prevents the torsion bar from rotating to prevent the seat belt from being withdrawn, and a plastically deformable energy absorbing member (EA plate) which is arranged between the inner periphery of the cylindrical member and the outer periphery of the torsion bar (for example, see Japanese Unexamined Patent Application Publication No. JP-A-2005-170266: Patent Document 1).

In this conventional technique, the tension of the seat belt restraining the occupant from moving forward due to inertia force generates a relative rotational force of one end side of the torsion bar in the seat belt withdrawing direction relative to the other end side of the torsion bar when the torsion bar is prevented from rotating by the locking mechanism in the event of an emergency. As the relative rotational force reaches a certain value or more, the torsion bar plastically deforms by torsional force according to the relative rotation so as to absorb the impact energy because of the plastic deformation resistance. According to this action, the EA plate arranged between the inner periphery of the cylindrical member and the outer periphery of the torsion bar deforms plastically and is wound onto the outer periphery of the torsion bar in the seat belt withdrawing direction, thereby absorbing the impact energy because of the plastic deformation resistance.

As the relative rotation between the cylindrical member and the torsion bar advances and the substantially entire portion of the EA plate is wound onto the torsion bar in this manner, the impact energy absorption is then conducted solely by the torsional deformation of the torsion bar. That is, the energy absorption load (hereinafter, referred to as "EA load") by the conventional EA mechanism is first the sum (hereinafter, sometimes referred to as "first-stage EA load") of the EA load by the torsional deformation of the torsion bar and the EA load by the plastic deformation of the EA plate and then becomes the EA load solely by the torsional deformation of the torsion bar (hereinafter, sometimes referred to as "second-stage EA load") after the winding of the EA plate is finished. In this manner, the energy absorption is conducted while changing the EA load in two stages so that the cylindrical member is allowed to gradually rotate to withdraw the seat belt while applying tension of a certain value or more on the seat belt even though the locking mechanism works, thereby absorbing the force acting on the seat belt and the occupant's body.

The aforementioned Patent Document 1 discloses a basic structure of the EA mechanism of absorbing impact energy applied to the occupant while changing the EA load in two stages.

To optimize the EA mechanism for the purpose of enough protect the occupant's body, it is desired to avoid abrupt change in the EA load, for example, by gradually changing the EA load from the first-stage load to the second-stage load.

It is an object of the present invention to provide a seat belt retractor capable of optimizing EA load by avoiding abrupt change in the EA load, and to provide a seat belt apparatus having the same.

Further objects and advantages of the invention will be apparent from the following description of the invention.

SUMMARY OF THE INVENTION

For achieving the object, a seat belt retractor of the first invention comprises: a cylindrical member which is rotatable for winding up a seat belt; a shaft member which is arranged inside said cylindrical member and is torsionally deformable, said shaft member having one end side in the axial direction connected to said cylindrical member so that the one end side rotates together with said cylindrical member; a plate mounting member which is arranged inside an axial end of said cylindrical member and is disposed on the outer periphery of the other end portion in the axial direction of said shaft member; a locking mechanism for preventing the rotation of the plate mounting member in the seat belt withdrawing direction; and a plate member having one end portion fixed to the outer periphery of said plate mounting member and the other end portion stopped at the inner periphery of said axial end of said cylindrical member, said plate mounting being plastically deformable so that said plate member is wound onto the outer periphery of said plate mounting member during relative rotation between said cylindrical member and said shaft member, wherein said plate mounting member includes: a first reducing radius portion of which radius gradually reduces toward the downstream in the winding direction of the plate member onto said plate mounting member; and a second reducing radius portion which is located on the downstream side in the winding direction relative to said first reducing radius portion, said second reducing radius portion having a radius reducing rate greater than that of the first reducing radius portion.

According to the retractor, as the plate mounting member is prevented from rotating in the seat belt withdrawing direction by the locking mechanism in case of emergency, tension of the seat belt which restrains the occupant tending to move forward due to inertia force generates relative rotational force of the cylindrical member in the belt withdrawing direction relative to the shaft member. Since the shaft member is torsionally deformable, the shaft member is plastically deformed by torsional force based on the relative rotation when the relative rotation becomes a predetermined value or more. The resistance by this plastic deformation absorbs the impact energy. According to this movement, the plate member disposed between the plate mounting member and the cylindrical member which rotate relative to each other is wound onto the outer periphery of the plate mounting member with plastically deforming. The resistance by this plastic deformation also absorbs the impact energy.

As mentioned above, the plastic deformation of the shaft member and the plastic deformation of the plate member both function as the energy absorption mechanism (EA mechanism) in the first stage. Therefore, the entire energy absorption load becomes the sum (hereinafter, sometimes referred to as "first-stage EA load") of EA load by the torsional deformation of the shaft member and the EA load by the winding of the plate member onto the outer periphery of the plate mounting member. After the winding of the plate member onto the plate mounting member is finished, the energy absorption solely by the plastic deformation of the shaft member is conducted so that the entire energy absorption load becomes the EA load (hereinafter, sometimes referred to "second-stage EA load") only by the torsional deformation of the shaft member. In this manner, the energy absorption is conducted with changing the EA load in two stages.

In the retractor of the first invention, the plate mounting member includes a first reducing radius portion of which radius gradually reduces toward the downstream in the winding direction of the plate member onto the plate mounting member; and a second reducing radius portion which is located on the downstream side in the winding direction relative to the first reducing radius portion and whose radius reducing rate is greater than that of the first reducing radius portion. Since the dimension in the radial direction of the annular space between the outer periphery of the plate mounting member and the inner periphery of the cylindrical member is constant until the winding position of the plate member relative to the plate mounting member reaches the first reducing radius portion, the curvature of the turn-around portion of the plate member when the plate member is plastically deformed within the annular space is constant so that the EA load by the plastic deformation of the plate member is constant. That is, the first-stage EA load is constant. After that, as the winding position of the plate member reaches the first reducing radius portion, the curvature of the turn-around portion of the plate member gradually increases so that the EA load by the plastic deformation of the plate member gradually reduces because the radius of the plate mounting member gradually decreases so that the dimension in the radial direction of the annular space gradually increases. As the winding position of the plate member then reaches the second reducing radius portion, the curvature of the turn-around portion of the plate member further increases so that the EA load by the plastic deformation of the plate member further reduces because the radius of the plate mounting member decrease at a greater rate so that the dimension in the radial direction of the annular space sharply increases.

When the dimension in the radial direction of the annular space is constant, the EA load tends to increase temporarily immediately before and after the winding of the plate member onto the plate mounting member is finished because resistance is generated by releasing the fold of the terminal of the other end portion of the plate member. Therefore, in the first invention, since the second reducing radius portion of the plate mounting member is placed about the position where the winding of the plate member is finished, the increase in the EA load due to the resistance by the terminal of the plate member is cancelled, thereby reducing the EA load at substantially the same decreasing rate as that at the first reducing radius portion. Accordingly, the abrupt change in the EA load is prevented and the EA load is gradually reduced from the first-stage EA load to the second-stage EA load. In this manner, optimization of the EA load is achieved.

A seat belt retractor of the second invention has the same components of the first invention, wherein the outer peripheral configuration of said plate mounting member at said first reducing radius portion is arcuate, and the outer peripheral configuration of said plate mounting member at said second reducing radius portion is linear.

Therefore, the radius of the plate mounting member gradually reduces at the first reducing radius portion, while the radius of the plate mounting member sharply decreases at the second reducing radius portion. As a result of this, the effect of canceling temporal increase in the EA load by the resistance of the terminal of the plate member is enhanced, thereby further optimizing the EA load.

For achieving the object, a seat belt retractor of the third invention comprises: a cylindrical member which is rotatable for winding up a seat belt; a shaft member which is arranged inside said cylindrical member and is torsionally deformable, said shaft member having one end side in the axial direction connected to said cylindrical member so that the one end side rotates together with said cylindrical member; a plate mounting member which is arranged inside an axial end of said cylindrical member and is disposed on the outer periphery of the other end portion in the axial direction of said shaft member; a locking mechanism for preventing the rotation of the plate mounting member in the seat belt withdrawing direction; and a plate member having one end portion fixed to the outer periphery of said plate mounting member and the other end portion stopped at the inner periphery of said axial end of said cylindrical member, said plate mounting member being plastically deformable so that said plate member is wound onto the outer periphery of said plate mounting member during relative rotation between said cylindrical member and said shaft member, wherein said axial end of said cylindrical member has: a convexity which is formed in the inner periphery of said axial end and whose contact face comes in contact with the end of the other end portion of said plate member so as to stop said plate member; and a concavity which is formed in the inner periphery of said axial end and is located at the side of the contact face of said convexity.

As mentioned above, in case of a retractor in which the dimension in the radial direction of the annular space between the outer periphery of the plate mounting member and the inner periphery of the cylindrical member is constant, the EA load tends to increase temporarily immediately before and after the winding of the plate member onto the plate mounting member is finished because resistance is generated by releasing the fold of the terminal of the plate member.

According to the third invention, the axial end of the cylindrical member has: a convexity which is formed in the inner periphery of the axial end and whose contact face comes in contact with the end of the other end portion of the plate member so as to stop the plate member; and a concavity which is formed in the inner periphery of the axial end and is located at the side of the contact face of the convexity. Accordingly, in the event of an emergency, the end of the other end portion of the plate member is stopped by the convexity and the relative rotation between the cylindrical member and the shaft member is caused so that the plate member is wound onto the outer periphery of the plate mounting member with being plastically deformed. Immediately before and after the winding of the plate member is finished, the terminal of the plate member is allowed to be released from the folded state in the annular space of which dimension in the radial direction is increased by the concavity. As a result, the resistance generated when the fold of the terminal of the plate member is released is reduced, thereby restricting the EA load from temporarily increasing around the time when the winding of the plate member is finished. Therefore, abrupt change in the EA load is avoided, thereby optimizing the EA load.

A seat belt retractor of the fourth invention has the same components of the third invention, wherein the height of said convexity is set to be the minimum height required to stop the end of the other end portion of said plate member.

In the retractor, the other end side of the plate member is stopped by the convexity formed in the inner periphery of the cylindrical member and the plate member is wound onto the plate mounting member while being plastically deformed according to the relative rotation between the cylindrical member and the shaft member in the event of emergency. As the winding of the plate member onto the plate mounting member is finished, the other end portion of the plate member climbs the convexity, thereby releasing the plate member from being stopped by the convexity.

Especially in the fourth invention, the height of the convexity is set to be the minimum height required to stop the end of the other end portion of the plate member. This ensures the stop of the end of the other end portion of the plate member to be wound onto the ring. On the other hand, the height of the convexity is set not to be higher than necessary, thereby allowing the end of the other end portion of the plate member to easily climb after the finish of the winding. As a result, the resistance generated when the plate member climbs the convexity after the finish of the winding is reduced, thereby also avoiding abrupt change in the EA load.

For achieving the aforementioned object, a seat belt retractor of the fifth invention comprises: a cylindrical member which is rotatable for winding up a seat belt; a shaft member which is arranged inside said cylindrical member and is torsionally deformable, said shaft member having one end side in the axial direction connected to said cylindrical member so that the one end side rotates together with said cylindrical member; a plate mounting member which is arranged inside an axial end of said cylindrical member and is disposed on the outer periphery of the other end portion in the axial direction of said shaft member; a locking mechanism for preventing the rotation of the plate mounting member in the seat belt withdrawing direction; and a plate member having one end portion fixed to the outer periphery of said plate mounting member and the other end portion stopped at the inner periphery of said axial end of said cylindrical member, said plate member being plastically deformable so that said plate member is wound onto the outer periphery of said plate mounting member during relative rotation between said cylindrical member and said shaft member, wherein said plate mounting member includes: a first reducing radius portion having radius gradually decreasing toward the downstream in the winding direction of the plate member onto said plate mounting member; and a second reducing radius portion which is located on the downstream side in the winding direction relative to said first reducing radius portion and whose the radius reducing rate is greater than that of the first reducing radius portion, and wherein said axial end of said cylindrical member has: a convexity which is formed in the inner periphery of said axial end and whose contact face comes in contact with the end of the other end portion of said plate member so as to stop said plate member, and a concavity which is formed in the inner periphery of said axial end and is located at the side of the contact face of said convexity.

According to the fifth invention, the second reducing radius portion of the plate mounting member is located about where the winding of the plate member is finished and the concavity is formed in the inner periphery of the axial end of the cylindrical member and is located at the side of the contact face of the convexity, thereby synergistically obtaining the aforementioned two effects. That is, the effect of significantly reducing the EA load by the plastic deformation of the plate member as a result of that the fold of the terminal of the plate member is released in the annular space of which dimension in the radial direction is sharply increased by the second reducing radius portion and the effect of further reducing the EA load by the plastic deformation of the plate member as a result of that the fold of the terminal of the plate member is released in the annular space of which dimension in the radial direction is further increased by the concavity. As a result, the effect of canceling the temporal increase in the EA load due to the resistance of the terminal of the plate member is enhanced, thereby reducing the EA load at substantially the same decreasing rate of the EA load as that at the first reducing radial portion. This configuration further avoids abrupt change in the EA load during transition from the first-stage EA load to the second-stage EA load, thereby further optimizing the EA load.

A seat belt retractor of the sixth invention is such that the other end portion of said plate member has a groove which is formed in a surface thereof facing the inner periphery of said cylindrical member.

The groove allows the folded portion of the terminal of the plate member to be plastically deformed easily as compared to the other portions, thereby reducing the resistance by the terminal of the plate member around the time when the winding of the plate member onto the plate mounting portion is finished.

In case that the convexity is formed on the inner periphery of the cylindrical member for stopping the plate member, the groove also allow the other end portion of the plate member to climb the convexity easily after the finish of the winding, thereby also reducing the resistance generated when the plate member climbs the convexity. Furthermore, when the energy absorption is conducted solely by the plastic deformation of the shaft member, the groove also reduces resistance generated when the relative rotation between the cylindrical member and the shaft member progresses so that the end of the other end portion of the plate member contacts the convexity again.

For achieving the aforementioned object, a seat belt apparatus of the seventh invention includes: a seat belt for restraining an occupant; a seat belt retractor according to any one of first through sixth inventions, for retracting one end side of the seat belt while allowing the seat belt to be withdrawn; a tongue supported by said seat belt; and a buckle to which said tongue is latched so as to buckle up the seat belt.

In the seat belt apparatus of the seventh invention, abrupt change in the EA load during transition from the first-stage EA load to the second-stage EA load is avoided by the retractor so that the EA load gradually reduces, thereby optimizing the EA load. As a result, impact energy applied to the occupant by the seat belt is sufficiently absorbed, thereby improving the safety of the occupant.

According to the present invention, abrupt change in EA load is avoided, thereby optimizing the EA load.

DETAILED DESCRIPTION OF PREFERRED EMBODIMENTS

Hereinafter, preferred embodiments of the present invention will be described with reference to attached drawings.

Figure 1:
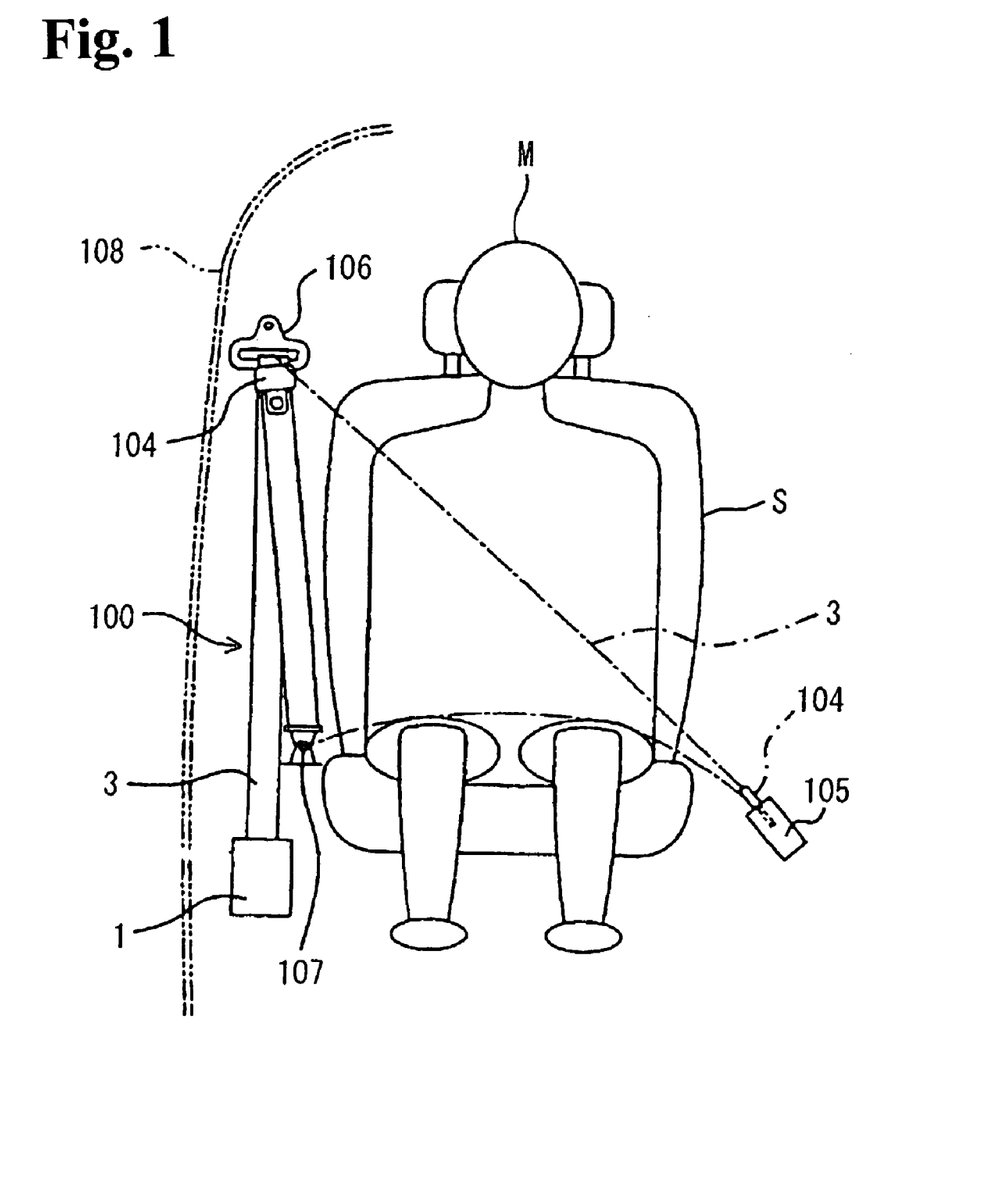
FIG. 1 is a front view showing an entire structure of a seat belt apparatus of an embodiment according to the present invention together with an occupant.

FIG. 1 is a front view showing the entire structure of a seat belt apparatus according to this embodiment together with an occupant.

In FIG. 1, the seat belt apparatus 100 is arranged inside a vehicle body 108 of a vehicle and comprises a seat belt 3 for restraining an occupant M to a vehicle seat S, a retractor 1 for winding up one end side of the seat belt 3 in such a manner as to allow the seat belt 3 to be withdrawn, a tongue 104 which is slidably attached to the seat belt 3, and a buckle 105 which can be latched with the tongue 104.

The seat belt 3 has one end which is wound up by the retractor 1 as mentioned above, a middle portion which is inserted into a deflection fitting 106, and the other end which is pivotally connected to the vehicle body 108 by an anchor 107.

Figure 2:
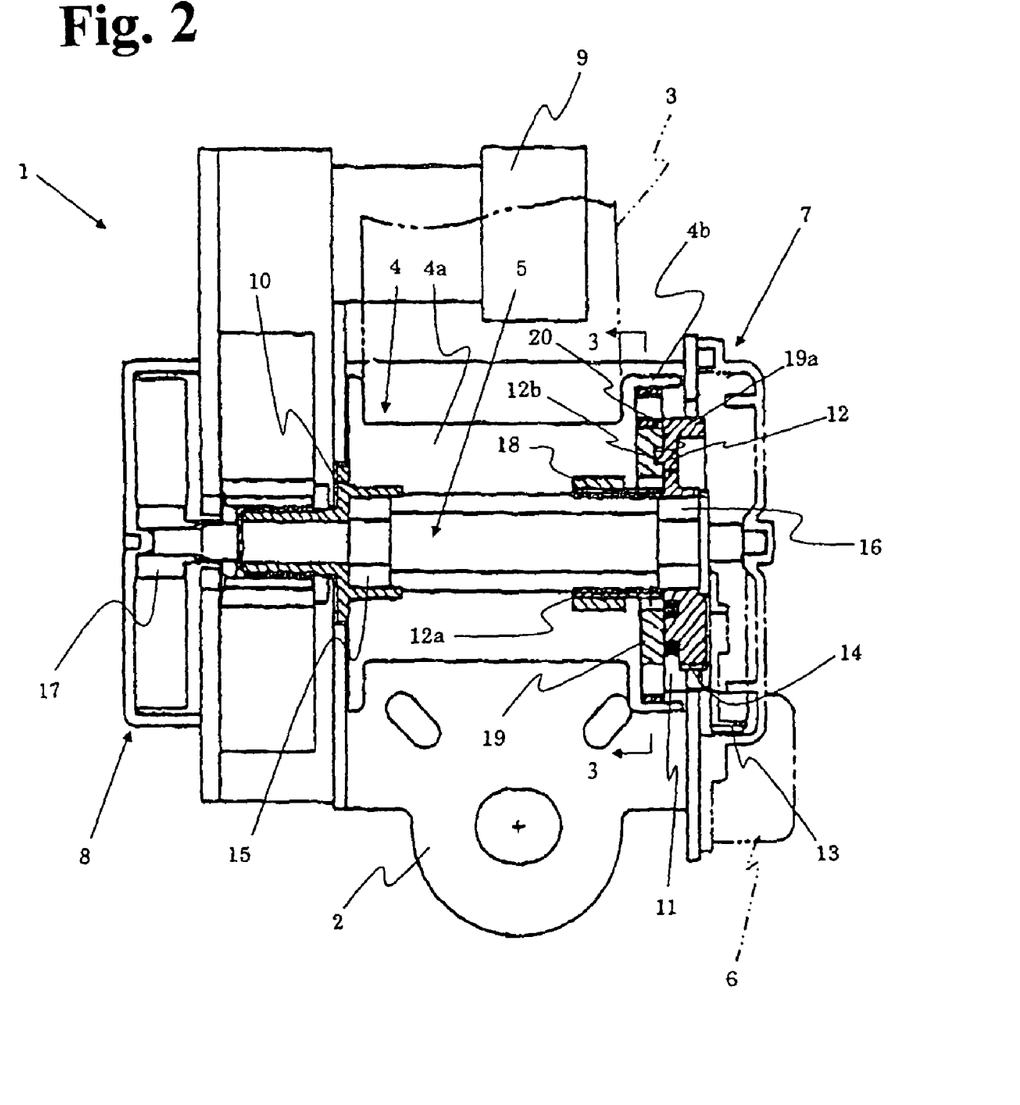
FIG. 2 is a vertical sectional view showing an entire schematic structure of a seat belt retractor of the embodiment of the present invention.

Hereinafter, the detail structure of the retractor 1 will be described. FIG. 2 is a vertical sectional view showing the entire schematic structure of the seat belt retractor of this embodiment.

In FIG. 2, the retractor 1 comprises a frame 2, a spool 4 (cylindrical member) onto which the seat belt 3 is wound, a torsion bar 5 (shaft member) made of a torsionally deformable material, a deceleration sensing means 6 which detects a large deceleration caused in the event of an emergency and is thus actuated, a locking mechanism 7 for preventing the spool 4 at least from rotating in the belt withdrawing direction, a spring means 8 having a spiral spring (not shown), a pretensioner 9 which is actuated in the event of an emergency to generate belt winding torque, and a bush 10 for transmitting the belt winding torque of the pretensioner 9 to the spool 4.

The locking mechanism 7 comprises a locking base 12 which pivotally holds a pawl 11, and a lock gear 13. Since the lock gear 13 may be a conventional one, illustration of detail structure of the lock gear 13 is omitted. Normally, the lock gear 13 rotates together with the torsion bar 5. On the other hand, in the event of an emergency, the lock gear 13 is stopped by the action of the deceleration sensing means 6 so as to generate relative rotation between the lock gear 13 and the torsion bar 5, thereby engaging the pawl 11 with internal teeth 14 of the side wall of the frame 2. As a result of this, the locking base (i.e. the spool 4) is prevented from rotating in the seat belt withdrawing direction. Though detailed illustration is omitted, the locking base 12 of the locking mechanism 7 generates relative rotation relative to the lock gear 13 in the seat belt withdrawing direction also when the seat belt 3 is rapidly withdrawn, thereby preventing the seat belt 3 from being withdrawn in the same manner as mentioned above.

The torsion bar 5 is disposed to penetrate through the inside (for details, the center in the radial direction) of the spool 4 in the axial direction. The torsion bar 5 comprises a second torque transmitting portion 15 which is located at one end side (the left side in FIG. 2) in the axial direction and is fitted to the other end side in the axial direction of the spool 4 not to allow relative rotation between the second torque transmitting portion 15 and the spool 4, and a first torque transmitting portion 16 which is located at the other end side (the right side in FIG. 2) and is fitted to the locking base 12 not to allow relative rotation between the first torque transmitting portion 16 and the locking base 12 (that is, is supported to the locking base 12 to allow rotation together with the locking base 12) so that the torsion bar 5 functions to connect the spool 4 and the locking mechanism 7 such that they rotate together with each other.

The spool 4 comprises a cylindrical body 4a onto which the seat belt 3 is wound, and a large diameter cylindrical portion 4b (axial end) having an outer diameter larger than that of the cylindrical body 4a and is rotatably supported between both side walls of the frame 2. The spool 4 is always biased in the seat belt winding direction by spring force of the spiral spring of the spring means 8 through a bush 17, the torsion bar 5, the second torque transmitting portion 15 of the torsion bar 5, and the bush 10. According to this structure, the one end portion (the left side in FIG. 2) in the axial direction of the torsion bar 5 is connected to the spool 4 to rotate together with the spool 4. When the pretensioner 9 is actuated, belt winding torque generated by the pretensioner 9 is transmitted to the spool 4 through the bush 10, whereby the spool 4 winds up a predetermined length of the seat belt 3.

Between the spool 4 and the shaft portion 12a of the locking base 12, an annular lock member 18 for preventing relative rotation is disposed. The lock member 18 is provided with internal thread (not shown) formed in the inner periphery thereof, which is screwed with an external thread (not shown) formed in the shaft portion 12a of the locking base and is fitted into an axial bore of the spool 4 such that the lock member 18 is not allowed to rotate relative to the spool 4 and is allowed to move in the axial direction. As the spool 4 rotates in the belt withdrawing direction relative to the locking base 12, the lock member 18 rotates together with the spool 4 and thus moves rightward as seen in FIG. 2.

On the inner side of a right axial end portion, as seen in FIG. 2, of the spool 4, a ring 19 (plate mounting member) and a plate member 20 which is plastically deformable are attached. The ring 19 has substantially a disk-like shape and is disposed loosely such that the torsion bar 5 penetrates in the axial direction through the center in the radial direction of the ring 19. The ring 19 has an engaging concavity 19a formed in the right side as seen in FIG. 2 (the locking base 12 side). The engaging concavity 19a is engaged with an engaging convexity 12b formed in the left side as seen in FIG. 2 of the locking base 12, whereby the ring 19 is connected to the outer periphery of the other end portion in the axial direction of the torsion bar 5 through the locking base 12 such that the ring 19 rotates together with the other end portion of the torsion bar 5.

Figure 3:
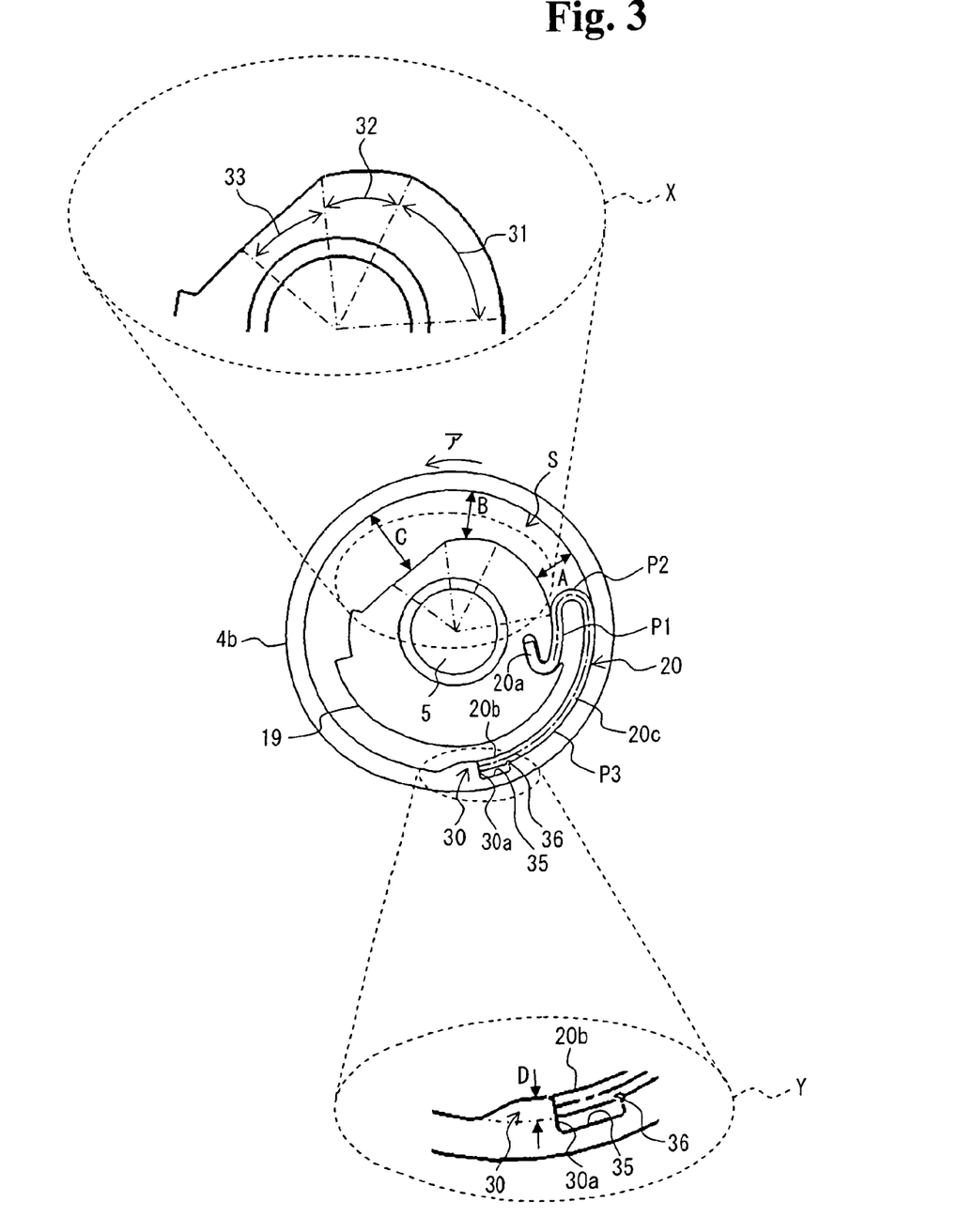
FIG. 3 includes a sectional view taken along line 3-3 in FIG. 2 showing detailed mounting structure of a plate member and partial enlarged views thereof.
Figure 4:
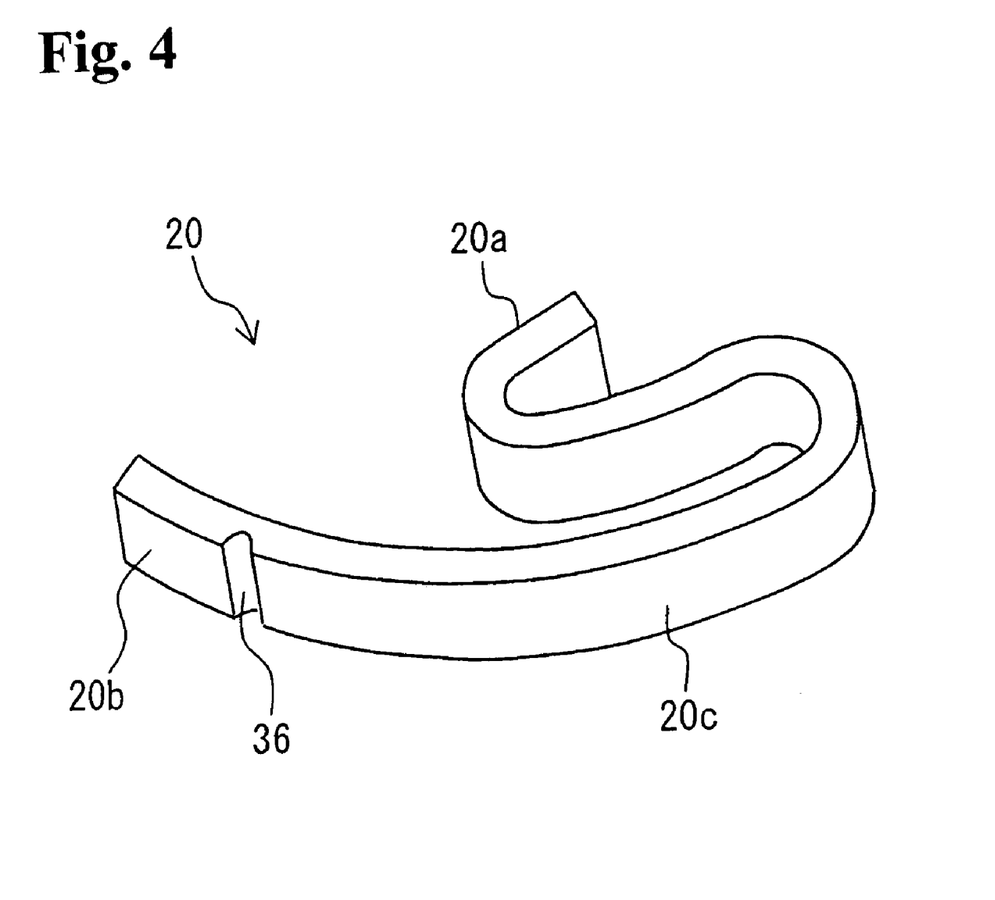
FIG. 4 is a perspective view showing the plate member as extracted in the mounted state.

FIG. 3 includes a sectional view taken along 3-3 section in FIG. 2, showing detail mounting structure of the plate member 20 and partial enlarged views thereof. FIG. 4 is a perspective view showing the plate member 20 as extracted in the mounted state.

As shown in FIGS. 3 and 4, in the aforementioned mounted state, one end portion 20a (radially inside of the ring 19 and the spool 4) of the plate member 20 is tightly fixed to an outer peripheral portion of the disk-like ring 19 by suitable means. On the other hand, the other end portion 20b (radially outside of the ring 19 and the spool 4) of the plate member 20 is in contact with a contact face 30a of a convexity 30 formed in the inner periphery of the large-diameter cylindrical portion 4b of the spool 4 so that the other end portion 20b is stopped while being allowed to be detached (details will be described later). An intermediate portion 20c between the one end portion 20a and the other end portion 20b forms an outer peripheral extending portion (portion P1 in FIG. 3) extending along the outer periphery of the ring 19 from the one end portion 20a in the seat belt withdrawing direction (the counterclockwise direction as seen in FIG. 3), and then forms a turn-around portion (portion P2 in FIG. 3) turning around by 180° within an annular space S of a radial dimension A formed between the outer periphery of the ring 19 and the inner periphery of the large-diameter cylindrical portion 4b of the spool 4. After turning around, the intermediate portion 20c forms an inner peripheral extending portion (portion P3 in FIG. 3) extending along the inner periphery of the large-diameter cylindrical portion 4b of the spool 4 in the seat belt winding direction (the clockwise direction as seen in FIG. 3) and then becomes the other end portion 20b which is in contact with the contact face 30a of the aforementioned convexity 30 formed on the inner periphery of the large-diameter cylindrical portion 4b of the spool 4. In addition, the other end portion 20b of the plate member 20 has a groove 36 which has a V-like section and is formed in the surface thereof facing the inner periphery of the large-diameter cylindrical portion 4b of the spool 4.

As shown in the partial enlarged view X of FIG. 3, the ring 19 includes a constant radius portion 31 of which radius is constant in a range where the plate member 20 is wound onto the outer periphery of the ring 19, a first reducing radius portion 32 of which radius gradually reduces toward the downstream in the winding direction (direction shown by an arrow a in FIG. 3) of the plate member 20 onto the ring 19, and a second reducing radius portion 33 which is located on the downstream side in the winding direction relative to the first reducing radius portion and where the reducing rate of the radius of the ring 19 is greater than that of the first reducing radius portion 32. At the constant radius portion 31, the outer peripheral configuration of the ring 19 is circumferential so that the dimension A in the radial direction of the annular space S is constant. At the first reducing radius portion 32, the outer peripheral configuration of the ring 19 is arcuate so that the dimension B in the radial direction of the annular space S gradually increases. At the second reducing radius portion 33, the outer peripheral configuration of the ring 19 is linear so that the dimension C in the radial direction of the annular space S sharply increases. The second reducing radius portion 33 is located to be a place where the winding of the plate member 20 relative to the ring 19 will be finished.

As shown in the partial enlarged view Y of FIG. 3, the inner periphery of the large-diameter cylindrical portion 4b of the spool 4 is provided with the aforementioned convexity 30 having the contact face 30a which is in contact with the end of the other end portion 20b of the plate member 20 so as to stop the plate member 20, and a concavity 35 which is located at the side of the contact face 30a of the convexity 30. The height D of the aforementioned convexity 30 from the inner periphery of the large-diameter cylindrical portion 4b is set to be the minimum height required to stop the end of the other end portion 20b of the plate member 20. Especially, the height D is set to be substantially the same as the height of the end of the plate member 20.

The operation of the retractor 1 of this embodiment having the aforementioned structure will be described.

(I) Normal Operation

When the seat belt is not used, the seat belt 3 is completely retracted because of the biasing force of the spring means 8. As the seat belt 3 is withdrawn at a normal speed for wearing, the spool 4 is rotated in the seat belt withdrawing direction so that the seat belt 3 is smoothly withdrawn. After the tongue (not shown) slidably disposed on the seat belt 3 is inserted into and latched with the buckle fixed to the vehicle body, an excessively withdrawn portion of the seat belt 3 is wound up onto the spool 4 by the biasing force of the spring means 8 so that the seat belt 3 fits the occupant body without making the occupant feel pressure.

(II) Emergency Situation

In the event of an emergency, the seat belt winding torque generated by the pretensioner 9 is transmitted to the spool 4 so that the spool 4 winds up a predetermined length of the seat belt 3, thereby quickly restraining the occupant. On the other hand, the deceleration sensing means 6 is actuated by a large deceleration produced in the event of an emergency so that the lock gear 13 is prevented from rotating in the seat belt withdrawing direction and the pawl 11 of the locking mechanism 7 pivots to engage the internal teeth 14 of the side wall of the frame 2. Then, the locking base 12 and the torsion bar 5 are prevented from rotating in the seat belt withdrawing direction so that the tension of the seat belt 3 restraining the occupant from moving forward due to inertia force makes a relative rotational force of the spool 4 relative to the torsion bar 5 in the seat belt withdrawing direction. Accordingly, only the spool 4 rotates in the seat belt withdrawing direction relative to the torsion bar 5 while the torsion bar 5 is torsionally deformed.

As the relative rotation progresses a certain degree after that, the torsion bar 5 is first plastically deformed by torsional force due to the relative rotation. By the plastic deformation resistance, impact energy is absorbed. According to this action, the plate member 20 disposed between the ring 19 which rotates together with the locking base 12 and the spool 4 which rotates relative to the locking base 12 is gradually wound onto the outer periphery of the ring 19 in the seat belt withdrawing direction while being plastically deformed. Also by this plastic deformation resistance, the impact energy is further absorbed.

Figure 5A:
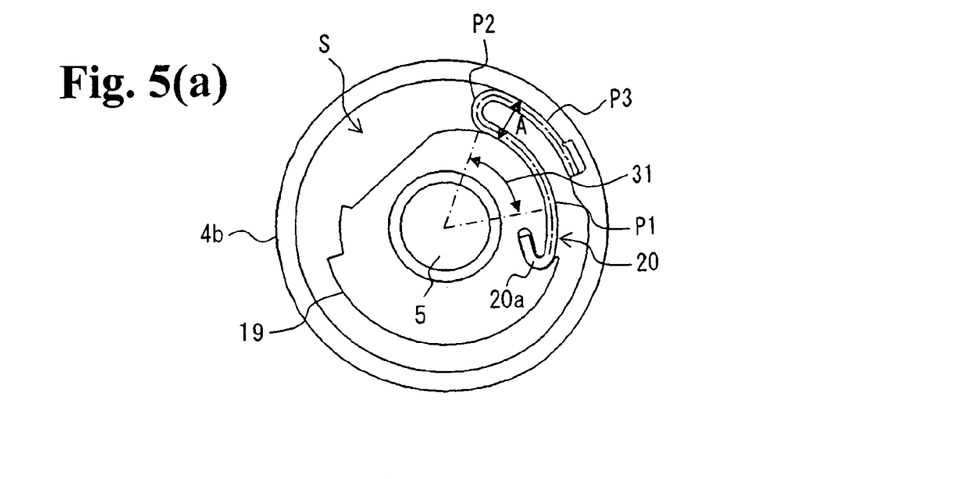
FIGS. 5(a) through 5(c) are illustrations showing behavior of plastic deformation of the plate member.
Figure 5B:
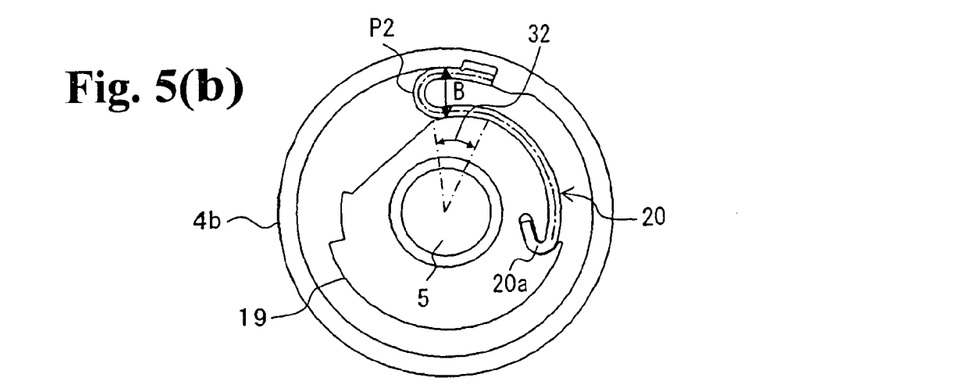
Figure 5C:
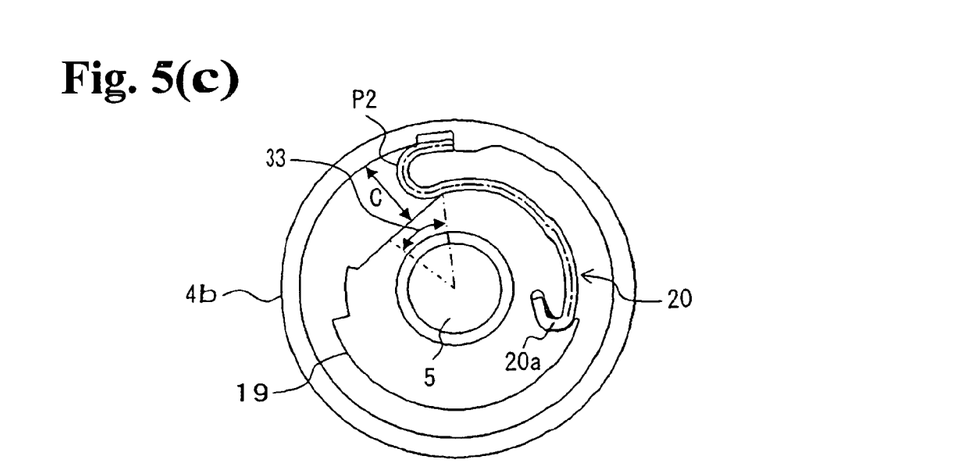

FIGS. 5(a)-5(c) are illustrations showing behavior of the plastic deformation of the plate member 20. It should be noted that illustration of the torsional displacement of the torsion bar will be omitted.

FIG. 5(a) shows behavior of plastic deformation of the plate member 20 at the constant radius portion 31. As shown in this figure, with progression of the winding of the plate member 20 by the relative rotation (rotation in the counterclockwise direction as seen in this figure) of the spool 4 relative to the torsion bar 5, the outer periphery extending portion (portion P1) extending along the outer periphery of the ring 19 from the one end portion 20a in the seat belt withdrawing direction is elongated so that the position of the turn-around portion (portion P2) within the annular space S of which radial dimension A is constant is moved in the seat belt withdrawing direction from the position shown in FIG. 3. In other words, the portion where the greatest plastic deformation is performed is gradually moved in the seat belt withdrawing direction. On the other hand, the inner periphery extending portion (portion P3) extending along the inner periphery of the large-diameter cylindrical portion 4b of the spool 4 in the seat belt winding direction is shortened.

Though, in FIG. 5(a), the top of the turn-around portion (portion P2) is located within a range corresponding to the first reducing radius portion 32, an end of a contact between the turn-around portion and the outer periphery of the ring 19 and an end of a contact between the turn-around portion and the inner periphery of the large-diameter cylindrical portion 4b of the spool 4 are located within a range corresponding to the contact radius portion 31 so that FIG. 5(a) shows behavior of the plastic deformation of the plate member 20 at the contact radius portion 31.

FIG. 5(b) shows behavior of the plate member 20 at the first reducing radius portion 32. As shown in this figure, the curvature of the turn-around portion (portion P2) of the plate member 20 is gradually increased within the annular space S of which dimension B in the radial direction is gradually increased.

Though, in FIG. 5(b) similarly to FIG. 5(a), the top of the turn-around portion (portion P2) is located within a range corresponding to the second reducing radius portion 33, the end of the contact between the turn-around portion and the outer periphery of the ring 19 and the end of the contact between the turn-around portion and the inner periphery of the large diameter cylindrical portion 4b of the spool 4 are located within a range corresponding to the first reducing radius portion 32 so that FIG. 5(b) shows behavior of the plastic deformation of the plate member 20 at the first reducing radius portion 32.

FIG. 5(c) shows behavior of the plate member 20 at the second reducing radius portion 33. As shown in this figure, the curvature of the turn-around portion (portion P2) is sharply increased within the annular space S of which dimension C in the radial direction is sharply increased.

FIGS. 6(a)-6(e) are illustrations showing behavior when the engagement between the other end portion 20b of the plate member 20 and the convexity 30 is cancelled. Also in these figures, illustration of the torsional displacement of the torsion bar 5 will be omitted.

Figure 6A:
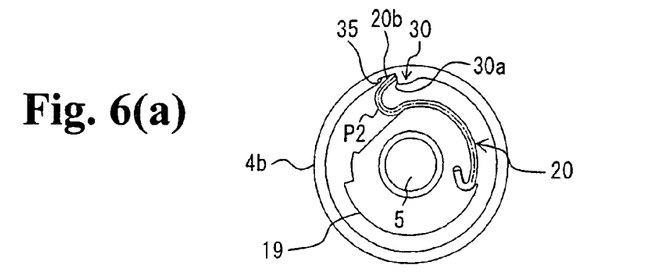
FIGS. 6(a) through 6(e) are illustrations showing behavior when the engagement between the other end portion of the plate member and the convexity is released.
Figure 6B:
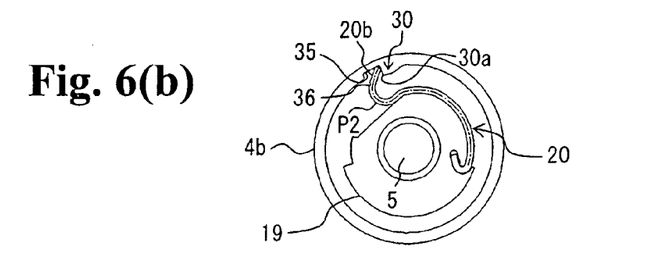
Figure 6C:
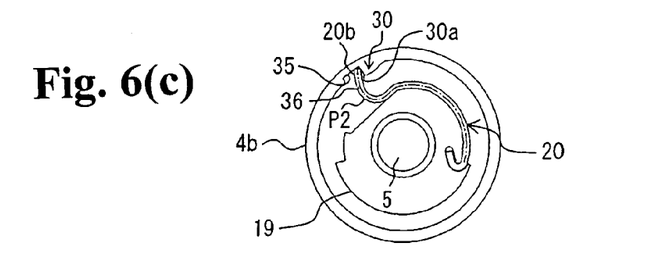
Figure 6D:
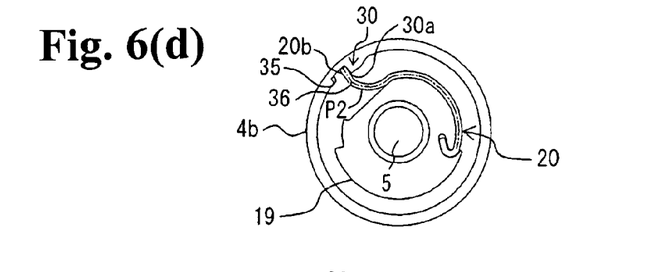

As the relative rotation progresses from the aforementioned state shown in FIG. 5(c), the end of the other end portion 20b of the plate member 20 enters into the concavity 35 because of the reaction force of the turn-around portion (portion P2) as shown in FIG. 6(a). Accordingly, the curvature of the turn-around portion (portion P2) of the plate member 20 is further increased. After that, from the state that the end of the other end portion 20b of the plate member 20 enters into the concavity 35, the end of the other end portion 20b is gradually tucked in the direction of relative rotation by the contact face 30a of the convexity 30 as shown in FIG. 6(b) through 6(d). Therefore, the turn-around portion (portion P2) of the plate member 20 is released from the folded state and is gradually stretched, while controlling the resistance (hereinafter, sometimes referred to as "end resistance") generated by the fold of the end of the other end portion 20b of the plate member 20. During this, the groove 36 formed in the other end portion 20b of the plate member 20 facilitates the plastic deformation of the other end portion 20b as compared to other portions of the plate member 20.

Figure 6E:
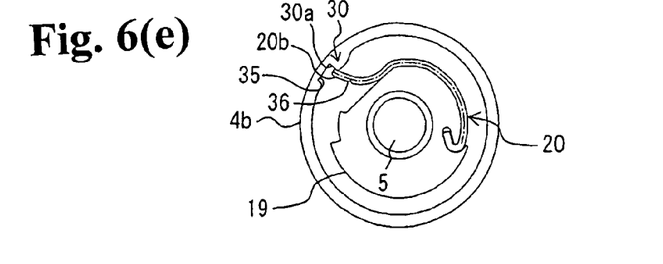

As the relative rotation further progresses, the end of the other end portion 20b of the plate member 20 moves apart from the concavity 35 as shown in FIG. 6(e). Though illustration is omitted, the end of the other end portion 20b of the plate member 20 climbs the convexity 30 and is thus released from the convexity 30. Also during this, the groove 36 formed in the other end portion 20b of the plate member 20 facilitates the other end portion of the plate member 20 to climb the convexity 30. In this manner, the engagement between the other end portion 20b of the plate member 20 and the convexity 30 is cancelled and the energy absorption by the plastic deformation of the plate member 20 is finished. After that, energy absorption solely by the torsional plastic deformation of the torsion bar 5 is conducted.

In this embodiment as mentioned above, according to the relative rotation of the spool 4 in the seat belt withdrawing direction with torsional deformation of the torsion bar 5, the plastic deformation of the torsion bar 5 and the plastic deformation of the plate member 20 both function as the energy absorption mechanism (EA mechanism). Therefore, the entire energy absorption load (hereinafter, sometimes referred to as "EA load") becomes the sum (hereinafter, sometimes referred to as "first-stage EA load") of EA load by the torsional deformation of the torsion bar 5 and the EA load by the winding of the plate member 20 onto the outer periphery of the plate mounting member. After the winding of the plate member 20 onto the ring 19 is finished, the energy absorption solely by the plastic deformation of the torsion bar 5 is conducted so that the entire energy absorption load becomes the EA load (hereinafter, sometimes referred to "second-stage EA load") only by the torsional deformation of the torsion bar 5. In this manner, the energy absorption is conducted with changing the EA load in two stages, thereby absorbing the inertia energy of the occupant and restricting the load applied to the seat belt 3.

Figure 7:
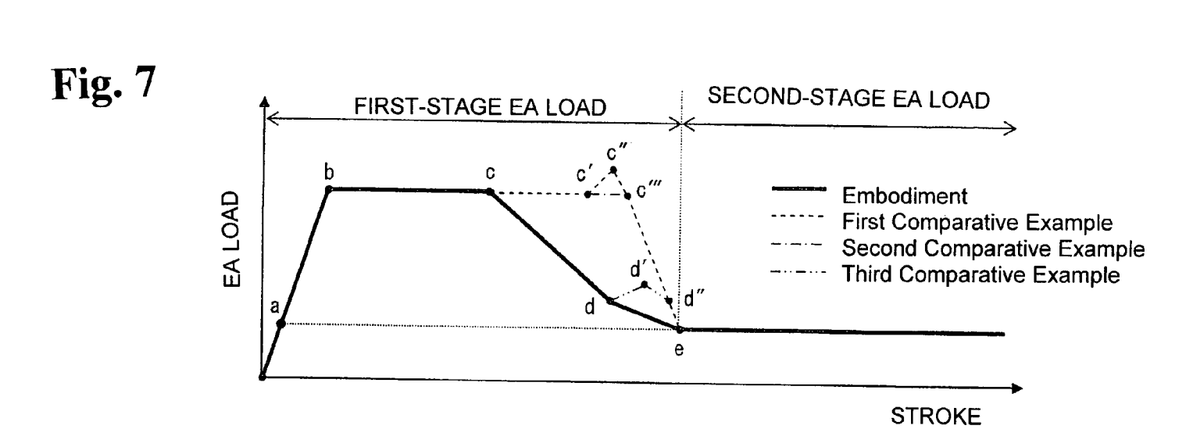
FIG. 7 is a graph showing behavior of EA load of an EA mechanism comprising the torsion bar and the plate member during the energy absorption.

FIG. 7 is a graph showing behavior of EA load of the EA mechanism composed of the torsion bar 5 and the plate member 20 during the energy absorption as mentioned above. The abscissa indicates stroke of the relative rotation of the spool 4 relative to the locking base 12. A heavy line (solid line) in the graph indicates the behavior of the EA load according to this embodiment and other lines composed of thin lines (broken line, dashed line, dashed-two dotted line) indicate behaviors of EA load according to comparative examples as will be described later.

In FIG. 7, the value of EA load is 0 when the stroke of relative rotation of the spool 4 relative to the locking base 12 is 0. As the aforementioned relative rotation starts so that the stroke starts to increase, the EA load by torsional deformation of the torsion bar 5 first increases proportionally as mentioned above. After that, as the stroke increases to a predetermined value (point "a" in FIG. 7), the plastic deformation of the plate member 20 starts in addition to the torsional deformation of the torsion bar 5 as mentioned above. Accordingly, the entire EA load becomes the sum of the EA load by the torsion bar 5 and the EA load by the plate member 20 (the first-stage EA load). As the stroke further increases, the first-stage EA load of the entire retractor 1 as the sum of these EA loads increases no more than a certain value (point "b" in FIG. 7). After that, the EA load keeps the certain value even the stroke increases (from the point "b" to the point "c" in FIG. 7). The aforementioned state shown in FIG. 5(a) corresponds to this state. That is, while the plate member 20 plastically deforms in a range corresponding to the constant radius portion 31, the EA load by the plastic deformation of the plate member 20 is constant because the dimension A in the radial direction of the annular space S is constant so that the curvature of the turn-around portion (portion P2) is constant.

As the stroke further increases, the first-stage EA load gradually decreases (from the point "c" to the point "d" in FIG. 7). The aforementioned state shown in FIG. 5(b) corresponds to this state. That is, as the plate member 20 starts its plastic deformation at the first reducing radius portion 32, the EA load by the plastic deformation of the plate member 20 gradually decreases because the dimension B in the radial direction of the annular space S gradually increases so that the curvature of the turn-around portion (portion P2) of the plate member 20 gradually increases.

As the stroke further increases, the first-stage EA load further decreases by relatively gentle inclination (from the point "d" to the point "e" in FIG. 7) at substantially the same decreasing rate (inclination from the point "c" to the point "d" in FIG. 7) as that at the first reducing radius portion 32. The aforementioned state shown in FIG. 5(c) corresponds to this state. Hereinafter, details will be described. That is, in case that the dimension in the radial direction of the annular space S is constant like the aforementioned constant radius portion 31, the EA load tends to increase temporarily around the time when the winding of the plate member 20 onto the ring 19 is finished because resistance is generated by releasing the fold of the end (hereinafter, sometimes referred to as "terminal") of the other end portion 20b of the plate member 20. In this embodiment, the second reducing radius portion 33 of the ring 19 is placed about the position where the winding of the plate member 20 is finished so as to sharply increase the curvature of the terminal of the plate member 20 in the annular space S because the dimension C in the radial direction at this place sharply increases, thereby significantly reduce the EA load by the plastic deformation of the plate member 20. This balances out the increase in the EA load due to the resistance by the terminal of the plate member 20, thereby reducing the EA load at substantially the same decreasing rate as that at the first reducing radius portion 32.

Since the concavity 35 is formed at the side of the contact face 30a of the convexity 30 on the inner periphery of the large-diameter cylindrical portion 4b of the spool 4, the terminal of the plate member 20 can be released from the fold in the annular space S of which dimension in the radial direction is further increased by the concavity 35. As a result, the resistance generated by the release from the fold is reduced, thereby temporarily balancing out and reducing the increase in the EA load around the time when the winding of the plate member 20 is finished.

Since the other end portion 20b of the plate member 20 has the groove 36 which is formed in the surface facing the inner periphery of the large-diameter cylindrical portion 4b of the spool 4, the turn-around portion (portion P2) of the plate member 20 is allowed to be plastically deformed easily as compared to the other portions, thereby also reducing the resistance by the terminal of the plate member 20 around the time when the winding of the plate member 20 onto the ring 19 is finished. Further, the groove 36 facilitates the other end portion 20b of the plate member 20 to climb the convexity 30 after the engagement between the other end portion 20b of the plate member 20 and the convexity 30 is cancelled, thereby reducing the resistance generated when the plate member 20 climbs the convexity 30. As mentioned above, the EA load is reduced at substantially the same decreasing rate as that at the first reducing radius portion 32.

After that, as the stroke further increases and the engagement between the other end portion 20b of the plate member 20 and the concavity 30 is cancelled, the EA load by the plate member 20 dissolves so that the entire EA load of the retractor 1 becomes to the EA load solely by the torsion bar 5 (the second-stage EA load). After that, the EA load keeps the second-stage EA load as the lower value even though the stroke increases (the right side from the point "e" in FIG. 7).

In this embodiment, an upper limit of the aforementioned stroke is defined by the aforementioned lock member 18. That is, the according to the relative rotation of the spool 4 in the belt withdrawing direction relative to the locking base 12, the lock member 18 moves in the axial rightward direction as seen in FIG. 2. As the lock member 18 reaches the end of the external thread of the locking base 12, the lock member 18 cannot further move in the axial rightward direction so as to lock the rotation, whereby the lock member 18 is prevented from rotating relative to the locking base 12. As a result, the spool 4 is also prevented from rotating relative to the locking base 12. That is, the rotation of the spool 4 in the belt withdrawing direction is locked so that the seat belt 3 is prevented from being withdrawn, whereby the occupant is restrained from inertia movement and is thus protected.

Figure 8:
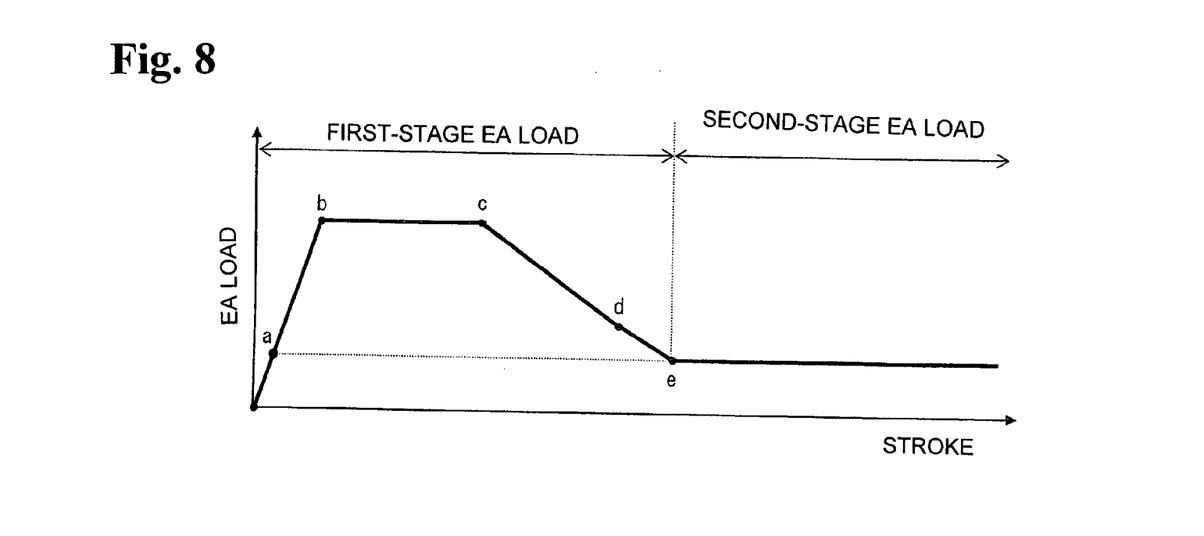
FIG. 8 is a graph showing another example of behavior of EA load of an EA mechanism comprising the torsion bar and the plate member during the energy absorption.

Though the aforementioned description has been made about a case where the decreasing rate (inclination from the point "c" to the point "d" in FIG. 7) at the first reducing radius portion 32 in the first-stage EA load is slightly different from the decreasing rate (inclination from the point "d" to the point "e" in FIG. 7) at the second reducing radius portion 33, the decreasing rate (inclination from the point "c" to the point "e" via the point "d" in FIG. 8) in the first-stage EA load may be set to be substantially constant as shown in FIG. 8 by controlling the decreasing rates of the dimension in the radial direction of the reducing radius portions 32, 33. Therefore, further suitable EA load can be obtained.

Returning to FIG. 7, the behavior of the EA load of the EA mechanism according to three comparative examples will be described. In the first comparative example, the dimension in the radial direction of the annular space S is constant over the whole circumference (that is, the ring 19 has neither of the first reducing radius portion 32 and the second reducing radius portion 33 and has only the constant radius portion 31) and the groove 36 is not formed in the plate member 20. The behavior of the EA load of the first comparative example having the aforementioned structure is shown by a broken line in FIG. 7. In the first comparative example, even after the constant value range in the first-stage EA load from the point "b" to the point "c", the EA load is kept at the constant value (from the point "c" to the point "c'"). Since the dimension in the radial direction of the annular space S is constant over the whole circumference, the curvature of the turn-around portion (portion P2) is constant so that the EA load by the plastic deformation of the plate member 20 is constant. After that, around the time when the winding of the plate member 20 onto the ring 19 is finished, the resistance by the terminal of the plate member 20 temporarily increase the EA load (from point "c'" to the point "c''" in FIG. 7). As the engagement between the other end portion 20b of the plate member 20 and the convexity 30 is cancelled so that the other end portion 20b is released from the convexity 30, the EA load by the plate member 20 dissolves so that the entire EA load of the retractor 1 rapidly decreases and returns to the EA load solely by the torsion bar 5 (from point "c''" to the point "e" in FIG. 7). Therefore, in the first comparative example, the EA load is abruptly changed.

In the second comparative example, the dimension in the radial direction of the annular space S is constant over the whole circumference similar to the first comparative example, but the groove 36 is formed in the plate member 20. The behavior of the EA load of the second comparative example having the aforementioned structure is shown by a dashed line in FIG. 7. In the second comparative example, the behavior from the start to the point "c'" in FIG. 7 is the same as the aforementioned first comparative example. Since the fold at the terminal of the plate member 20 is plastically deformed easily as compared to the other portions because of the groove 36, however, the second comparative example has an effect capable of reducing the resistance of the terminal around the time when the winding of the plate member 20 onto the ring 19 is finished. This eliminates the temporal increase in the EA load around the time when the winding of the plate member 20 onto the ring 19 is finished so that the value of the first-stage EA load is kept at the constant value (from the point "c'" to the point "c''''" in FIG. 7. However, as the engagement between the other end portion 20b of the plate member 20 and the convexity 30 is cancelled so that the other end portion 20b is released from the convexity 30, the EA load by the plate member 20 dissolves so that the entire EA load rapidly decreases similarly to the first comparative example (from point "c''''" to the point "e" in FIG. 7). Therefore, also in the second comparative example, the EA load is abruptly changed.

On the other hand, in the third comparative example, the ring 19 has the first reducing radius portion 32 where the dimension in the radius direction of the annular space S gradually increases (no second reducing radius portion 33) and the groove 36 is formed in the plate member 20. The behavior of the EA load of the third comparative example having the aforementioned structure is shown by a dashed-two dotted line in FIG. 7. In the third comparative example, the first-stage EA load gradually decreases from a predetermined stroke because of the effect by the first reducing radius portion 32 so that the behavior from the start to the point "d" in FIG. 7 is the same as the embodiment of the present invention. After that, however, as the stroke increases and the winding of the plate member 20 onto the ring 19 is nearly finished, the temporal increase in the EA load due to the resistance of the terminal of the plate member 20 as mentioned above is not absorbed enough so that the EA load temporarily increases (from the point "d" to the point "d''" via the point "d'" in FIG. 7). As the engagement between the other end portion 20b of the plate member 20 and the convexity 30 is cancelled so that the other end portion 20b is released from the convexity 30, the EA load by the plate member 20 dissolves so that the entire EA load abruptly decreases (from point "d''" to the point "e" in FIG. 7). Therefore, in the third comparative example, the scale of the change in the EA load is small as compared to the aforementioned first and second comparative examples, but a small-scale abrupt change in the EA load is caused.

Though the aforementioned description has been made about a case where the EA load temporarily increases (from the point "d" to the point "d''" via the point "d'" in FIG. 7), the first-stage EA load may be kept substantially the same value so as to become nearly flat according to the reducing rate of the dimension in the radial direction of the first reducing radius portion 32 (i.e. to be flat from the point "d" to the point "d''" in FIG. 7). Then, also in this case, the EA load abruptly decreases (from the point "d''" to the point "e" in FIG. 7) when the EA load by the plate member 20 dissolves, thus causing a small-scale abrupt change in the EA load.

As mentioned above, in any of the first through third comparative examples, an abrupt change in the EA load is caused while transition from the first-stage EA load to the second-stage EA load. On the other hand, in the embodiment of the present invention, the abrupt change in the EA load is prevented and the EA load is gradually reduced from the first-stage EA load to the second-stage EA load.

According to the embodiment of the present invention as described in the above has following effects.

That is, in the retractor 1 of the embodiment of the present invention, the ring 19 comprises the first reducing radius portion 32 of which radius gradually reduces toward the downstream in the winding direction of the plate member 20 onto the ring 19, and a second reducing radius portion 33 of which reducing rate of the radius is greater than that of the first reducing radius portion 32. Since the dimension A in the radial direction of the annular space S between the outer periphery of the ring 19 and the inner periphery of the spool 4 is constant in the range corresponding to the constant radius portion 31 until the winding position of the plate member 20 relative to the ring 19 arrives at the first reducing radius portion 32, the curvature of the turn-around portion (portion P2) of the plate member 20 with being plastically deformed within the annular space S is constant so that the EA load by the plastic deformation of the plate member 20 is constant. That is, the first-stage EA load is constant. After that, as the winding position of the plate member 20 arrives at the first reducing radius portion 32, the radius of the ring 19 gradually reduces so that the dimension in the radial direction of the annular space S gradually increases. Accordingly, the curvature of the turn-around portion (portion P2) of the plate member 20 gradually increases so that the EA load by the plastic deformation of the plate member 20 gradually reduces. As the winding position of the plate member 20 then arrives at the second reducing radius portion 33, the radius of the ring 19 reduces at a greater rate so that the dimension C in the radial direction of the annular space S sharply increases. Therefore, the curvature of the turn-around portion (portion P2) of the plate member 20 further increases so that the EA load by the plastic deformation of the plate member 20 further reduces.

In the embodiment of the present invention, the second reducing portion 33 is located about a position where the winding of the plate member 20 onto the ring 19 is finished. This can cancel temporal increase in the EA load by resistance of the terminal of the plate member 20, thereby achieving the EA load reduction even at the second reducing radius portion 33 at substantially the same decreasing rate as that at the first reducing radius portion 32 as shown in FIG. 7 as mentioned above. Accordingly, abrupt change of the EA load during transition from the first-stage EA load to the second-stage EA load is avoided, thereby successively gradually reducing EA load. In this manner, optimization of the EA load is achieved.

Especially in the embodiment of the present invention, the outer peripheral configuration of the ring 19 at the first reducing radius portion 32 is arcuate, while the outer peripheral configuration of the ring 19 at the second reducing radius portion 33 is linear. Therefore, the radius of the ring 19 gradually reduces at the first reducing radius portion 32, while the radius of the ring 19 sharply reduces at the second reducing radius portion 33. As a result of this, the effect of canceling temporal increase in the EA load by the resistance of the terminal of the plate member 20 is enhanced, thereby further optimizing the EA load.

Further in the retractor 1 of this embodiment, the large-diameter cylindrical portion 4b of the spool 4 has the convexity 30 which is formed on the inner periphery of the large-diameter cylindrical portion 4b and of which contact face 30a comes in contact with the end of the other end portion 20b of the plate member 20 so as to stop the plate member 20 and the concavity 35 which is formed in the inner periphery of the large-diameter cylindrical portion 4b and is located at the side of the contact face 30a of the convexity 30. Accordingly, in the event of an emergency, the end of the other end portion 20b of the plate member 20 is stopped by the convexity 30 and the relative rotation between the spool 4 and the torsion bar 5 is caused so that the plate member 20 is wound onto the outer periphery of the ring 19 with being plastically deformed. Around the time when the winding of the plate member 20 is finished, the terminal of the plate member 20 is allowed to be released from the folded state in the annular space S of which dimension in the radial direction is increased by the concavity 35. As a result, the resistance generated when the fold of the terminal of the plate member is released is reduced, thereby restricting the EA load from temporarily increasing around the time when the winding of the plate member 20 is finished. Therefore, abrupt change in the EA load is avoided, thereby optimizing the EA load.

Further especially in this embodiment, the height of the convexity 30 is set to be the minimum height required to stop the end of the other end portion 20b of the plate member 20. This ensures the stop of the end of the other end portion of the plate member 20 to be wound onto the ring 19. On the other hand, the height of the convexity 30 is set not to be higher than necessary, thereby allowing the end of the other end portion of the plate member 20 to easily climb after the finish of the winding. Therefore, the resistance generated when the plate member 20 climbs the convexity 30 after the finish of the winding is reduced, thereby also obtaining an effect of avoiding abrupt change in the EA load.

In the retractor 1 of this embodiment, the second reducing radius portion 33 of the ring 19 is located about the position where the winding of the plate member 20 is finished and the concavity is formed in the inner periphery of the large-diameter cylindrical portion 4b of the spool 4 and is located at the side of the contact face 30a of the convexity 30, thereby synergistically obtaining the aforementioned two effects, that is, the effect of significantly reducing the EA load by the plastic deformation of the plate member 20 as a result of that the fold of the terminal of the plate member 20 is released in the annular space S of which dimension in the radial direction is sharply increased by the second reducing radius portion 33 and the effect of further reducing the EA load by the plastic deformation of the plate member 20 as a result of that the fold of the terminal of the plate member 20 is released in the annular space S of which dimension in the radial direction is further increased by the concavity 30. As a result, the effect of canceling the temporal increase in the EA load due to the resistance of the terminal of the plate member is enhanced, thereby reducing the EA load at substantially the same decreasing rate of the EA load as that at the first reducing radial portion 32. This further avoids abrupt change in the EA load during transition from the first-stage EA load to the second-stage EA load, thereby further optimizing the EA load.

Especially in this embodiment, the other end portion 20b of the plate member 20 has the groove 36 which is formed in the surface facing the inner periphery of the large-diameter cylindrical portion 4b of the spool 4. The groove 36 allows the folded portion of the terminal of the plate member 20 to be plastically deformed easily as compared to the other portions, thereby reducing the resistance by the terminal of the plate member 20 around the time when the winding of the plate member 20 onto the ring 19 is finished. The groove 36 also allow the other end portion 20b of the plate member 20 to climb the convexity 30 easily after the finish of the winding, thereby also reducing the resistance generated when the plate member 20 climbs the convexity 30. After that, the groove 36 also reduces resistance generated when the energy absorption is conducted solely by the plastic deformation of the torsion bar 5 and the relative rotation between the spool 4 and the torsion bar 5 progresses so that the end of the other end portion 20b of the plate member 20 collides the convexity 30 again (twice or three times).

The disclosure of Japanese Patent Application No. 2008-286431 filed on Nov. 7, 2008 is incorporated as a reference.

While the invention has been explained with reference to the specific embodiments of the invention, the explanation is illustrative and the invention is limited only by the appended claims.

What is claimed is:

1. A seat belt retractor for retracting a seatbelt, comprising:
a cylindrical member rotatable for winding up the seat belt;
a shaft member arranged inside the cylindrical member and being torsionally deformable, said shaft member having one end side in an axial direction connected to said cylindrical member so as to rotate together with said cylindrical member;
a plate mounting member arranged in the cylindrical member at an axial end thereof and disposed on an outer periphery of said shaft member at the other end portion in the axial direction so as to rotate together with the shaft member;
a locking mechanism for preventing a rotation of the plate mounting member in the seat belt withdrawing direction; and
a plate member having one end portion fixed to an outer periphery of said plate mounting member and the other end portion engaging an inner periphery of said cylindrical member, the plate member being plastically deformable so that said plate member is wound onto the outer periphery of said plate mounting member during a relative rotation between said cylindrical member and said shaft member,
wherein said plate mounting member includes a first reducing radius portion having a radius gradually decreasing toward a downstream in a winding direction of the plate member onto said plate mounting member, and a second reducing radius portion located on the downstream side relative to said first reducing radius portion and having a radius reducing rate greater than that of the first reducing radius portion.

2. The seat belt retractor according to claim 1, wherein an outer peripheral of the plate mounting member has an arcuate shape at said first reducing radius portion, and a linear shape at the second reducing radius portion.

3. The seat belt retractor according to claim 1, wherein the cylindrical member includes a convex portion formed in an inner periphery thereof at said axial end for contacting the other end portion of said plate member so as to support said plate member, and a concave portion formed in the inner periphery thereof at the axial end and located on a side where said convex portion and the plate member contact each other.

4. The seat belt retractor as claimed in claim 1, wherein the plate member has a groove in a vicinity of the other end portion thereof on a surface facing the inner periphery of said cylindrical member.

5. A seat belt apparatus for restraining an occupant, comprising:
the seat belt for restraining the occupant;
the seat belt retractor according to claim 1;
a tongue supported by said seat belt; and
a buckle for engaging said tongue.

6. A seat belt retractor for retracting a seat belt, comprising:
a cylindrical member rotatable for winding up the seat belt;
a shaft member arranged inside the cylindrical member and being torsionally deformable, said shaft member having one end side in an axial direction connected to said cylindrical member so as to rotate together with said cylindrical member;
a plate mounting member arranged in the cylindrical member at an axial end thereof and disposed on an outer periphery of said shaft member at the other end portion in the axial direction so as to rotate together with the shaft member;

a locking mechanism for preventing a rotation of the plate mounting member in the seat belt withdrawing direction; and a plate member having one end portion fixed to an outer periphery of said plate mounting member and the other end portion engaging an inner periphery of said cylindrical member, the plate member being plastically deformable so that said plate member is wound onto the outer periphery of said plate mounting member during a relative rotation between said cylindrical member and said shaft member, wherein the cylindrical member includes a convex portion formed in an inner periphery thereof at said axial end for contacting the other end portion of said plate member so as to hold said plate member, and a concave portion formed in the inner periphery thereof at the axial end and located on a side where said convex portion and the plate member contact each other.

7. The seat belt retractor according to claim 6, wherein the convex portion has a height so as to hold the other end portion of said plate member.

8. The seat belt retractor according to claim 7, wherein the convex portion has a height same as a thickness of the plate member in a radial direction of the cylindrical member.

* * * * *